(12) United States Patent
Lamesch

(10) Patent No.: US 9,061,641 B2
(45) Date of Patent: Jun. 23, 2015

(54) CAPACITIVE SENSOR INCLUDING RESONANT NETWORK

(75) Inventor: Laurent Lamesch, Reichlange (LU)

(73) Assignee: IEE INTERNATIONAL ELECTRONICS & ENGINEERING S.A., Luxembourg (LU)

( * ) Notice: Subject to any disclaimer, the term of this patent is extended or adjusted under 35 U.S.C. 154(b) by 0 days.

(21) Appl. No.: 13/977,851

(22) PCT Filed: Dec. 30, 2011

(86) PCT No.: PCT/EP2011/074315
§ 371 (c)(1),
(2), (4) Date: Jul. 1, 2013

(87) PCT Pub. No.: WO2012/093080
PCT Pub. Date: Jul. 12, 2012

(65) Prior Publication Data
US 2013/0277351 A1  Oct. 24, 2013

(30) Foreign Application Priority Data
Jan. 7, 2011 (LU) .......................................... 91773

(51) Int. Cl.
*G01N 17/00* (2006.01)
*B60R 21/015* (2006.01)
(Continued)

(52) U.S. Cl.
CPC ............. *B60R 21/015* (2013.01); *B60N 2/002* (2013.01); *B60N 2/5685* (2013.01); *H05B 1/0252* (2013.01); *B60R 21/01532* (2013.01); *B60R 21/0154* (2013.01)

(58) Field of Classification Search
CPC ...... G01N 27/223; G01N 22/04; G01N 22/00
USPC ................ 324/633, 668, 658, 663, 634, 664, 324/687–689
See application file for complete search history.

(56) References Cited

U.S. PATENT DOCUMENTS 5,525,843 A   6/1996  Howing
5,672,976 A * 9/1997  Egger et al. ................... 324/668
(Continued)

FOREIGN PATENT DOCUMENTS

DE   4110702 A1   10/1992
DE   4338285 A1    5/1995
(Continued)

OTHER PUBLICATIONS

International Search Report for corresponding application PCT/EP2011/074315 filed Dec. 30, 2011; Mail date Mar. 14, 2012.
(Continued)

*Primary Examiner* — Vincent Q Nguyen
(74) *Attorney, Agent, or Firm* — Cantor Colburn LLP

(57) ABSTRACT

A capacitive sensor includes a sensing antenna electrode for capacitively coupling to a counterelectrode to form a capacitance, this capacitance being responsive to an electric-field-influencing property of an object or person proximate to the antenna electrode. The counterelectrode may be part of the capacitive sensor. The capacitive sensor also includes a capacitive sensing network connected to the antenna electrode to apply an oscillating signal thereto and to determine the capacitance based upon characteristics of the oscillating signal. The capacitive sensing network includes at least one inductor and a plurality of reactive components arranged to form a resonant network together with the capacitance, the plurality of reactive components being activatable and deactivatable in such a way as to modify a resonance frequency of the resonant network.

24 Claims, 4 Drawing Sheets

(51) Int. Cl.
B60N 2/00 (2006.01)
B60N 2/56 (2006.01)
H05B 1/02 (2006.01)

(56) References Cited

U.S. PATENT DOCUMENTS

| | | | |
|---|---|---|---|
| 6,161,070 | A | 12/2000 | Jinno et al. |
| 6,348,862 | B1 | 2/2002 | McDonnell et al. |
| 6,392,542 | B1 | 5/2002 | Stanley |
| 6,703,845 | B2 | 3/2004 | Stanley et al. |
| 7,521,940 | B2 | 4/2009 | Koch et al. |
| 2009/0295199 | A1 | 12/2009 | Kincaid et al. |

FOREIGN PATENT DOCUMENTS

| | | |
|---|---|---|
| EP | 0944171 A1 | 9/1999 |
| WO | 9217344 A1 | 10/1992 |
| WO | 9513204 A1 | 5/1995 |

OTHER PUBLICATIONS

J. R. Smith, "Electric Field Sensing for Graphical Interfaces" J. R. Smith, published in Computer Graphics I/O Devices, Issue May/Jun. 1998, pp. 54-60.

Written Opinion for corresponding application PCT/EP2011/074315 filed Dec. 30, 2011; Mail date Mar. 14, 2012.

\* cited by examiner

CAPACITIVE SENSOR INCLUDING RESONANT NETWORK

TECHNICAL FIELD

The present invention generally relates to capacitive sensing, in particular to capacitive sensing using a resonant network. An aspect of the invention relates to a combined seat heating and capacitively occupancy sensing device.

BACKGROUND ART

A capacitive sensor, called by some electric field sensor or proximity sensor, is a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three-dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to a counterelectrode, which is typically at ground potential. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies an oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

Document DE 43 38 285 A1 discloses a combined seat heater and capacitive occupancy sensor wherein the heating element, together with the vehicle body as a counterelectrode, constitutes a capacitor. The capacitor is connected to an oscillating circuit, the frequency of which depends on the capacitance between the electrodes of the capacitor. The capacitance is dependent on the dielectric constant of the material, which is present between the electrodes. Thus, when the seat is unoccupied, a low dielectric constant exists, thereby providing low capacitance. This implies that the oscillator circuit oscillates at a relatively high frequency. Conversely, when the seat is occupied by a passenger, a higher dielectric constant is present and consequently the oscillator circuit oscillates at a relatively low frequency. By providing a control circuit that is activated by the presence of a frequency of certain magnitude, an arming signal can be transmitted to the airbag sensor when the seat is occupied.

A system of a similar type is described in document DE 41 10 702 A1. In this system the capacitor, whose frequency varies depending on the occupancy state, is formed by the heating element and electrode wires arranged in the vicinity of the heating element. A central control device measures the oscillation frequency to determine the occupancy state.

Document U.S. Pat. No. 5,525,843 also relates to a combined seat heater and capacitive occupancy sensor, wherein the change of the resonance frequency of the oscillator is used to determine whether the seat is occupied or empty.

What one tries to measure with such a capacitive sensing system is the overall impedance between the heating element and a counterelectrode (typically a grounded conductive surface or structure). The behaviour of the overall impedance is that of an a priori unknown complex network of resistors, capacitors and inductors. For a given, single, frequency, that complex network is electrically equivalent to a simple parallel network of a capacitive and a resistive component. The values of these components are frequency-dependent, which means that in a given situation (e.g. for a given occupancy state), measurements at different frequencies will yield different capacitance values and different resistance values. Therefore, measurements of the capacitance and the resistance carried out at different frequencies cannot directly be compared with one another. This represents a difficulty when the capacitive sensing network is allowed to oscillate at different resonance frequencies.

The variation of the resonance frequency over a large frequency range has the additional disadvantage that electromagnetic radiation is generated over this large frequency range. This poses a problem when radiation levels defined by automotive standards for example must not be exceeded by the capacitive measurement, for example to exclude interference in the AM bands of a radio receiver located in the car where the measurement circuit is installed. It is therefore preferred to restrain the frequency range to a defined range which does not overlap a critical frequency band where only low allowed radiation levels are defined, for example the AM radio frequency bands.

Finally, if variation of the resonance frequency is allowed over a large frequency range, there is also a non-negligible risk of receiving electromagnetic interference from other electronic appliances.

BRIEF SUMMARY

The disclosure provides a capacitive sensor wherein the above-mentioned drawbacks are eliminated or at least reduced.

A capacitive sensor comprises an antenna electrode (sensing antenna electrode) for capacitively coupling to a counterelectrode to form a capacitance, this capacitance being responsive to an electric-field-influencing property of an object or person proximate to the antenna electrode (i.e. between the antenna electrode and the counterelectrode). The counterelectrode may be or may not be part of the capacitive sensor. The capacitive sensor further comprises a capacitive sensing network connected to the antenna electrode to apply an oscillating signal (current or voltage) thereto and to determine the capacitance based upon characteristics (e.g. amplitude, phase, frequency, attenuation etc.) of the oscillating signal. According to the invention, the capacitive sensing network includes at least one inductor and a plurality of reactive components arranged to form a resonant network together with the capacitance, the plurality of reactive components being activatable and deactivatable in such a way as to modify a resonance frequency of the resonant network.

According to a preferred aspect of the invention, the capacitive sensor is implemented in a combined seat heater and capacitive occupancy sensor, e.g. for a vehicle seat. Such a combined seat heater and capacitive occupancy sensor comprises a heater network including a heating element connected between a first node and a second node to dissipate heat when a heating current is caused to flow between the first and second nodes, across the heating element, and a capacitive sensing network connected to the heating element to use the heating element as a sensing antenna electrode. The heating element is arranged for forming a capacitance with a counterelectrode, the capacitance being responsive to an electric-field-influencing property of an object or person proximate to the heating element. The capacitive sensing network is configured to apply an oscillating signal to the heating element and to determine the capacitance based upon characteristics of the oscillating signal. The heater network comprises a common mode choke with at least two windings, the heating element being connected in series between a first and a second winding of the at least two windings so as to be operatively connectable to a power source via the common mode choke. The capacitive sensing network includes a plurality of reactive components, arranged to form a resonant network with the first and/or the second winding and the capacitance, the plurality of reactive components being activatable and deactivatable in such a way as to modify a resonance frequency of the resonant network.

As those skilled will appreciate, thanks to the invention, the resonance frequency of the resonant network may be adjusted, in particular depending on the capacitance between the sensing antenna electrode (or the heating element) and the counterelectrode. The oscillating voltage preferably has a frequency in the range from about 50 kHz to about 10 GHz, more preferably in the range from about 50 kHz to about 30 MHz.

By activating or deactivating different groups of the reactive components, the capacitive sensor may perform a multitude of measurements at different resonance frequency. The combination of activated or deactivated reactive components may in particular be selected in such a way that the resonance frequencies of the measurements lie within a narrow frequency band, e.g. between 120 kHz and 150 kHz. As a consequence, the capacitance values obtained from these measurements can be directly compared to one another. The same is true for the resistance values obtained. Preferably, the capacitive sensing network comprises a control loop to confine the resonance frequency within a predefined target frequency band.

Since the resonance frequency of the capacitive sensing network may be confined to a narrow frequency band, noisy frequency bands can be avoided.

Preferably, the reactive components comprise capacitors. Alternatively or additionally, the reactive components may comprise further inductors. The reactive components may be arranged electrically in parallel to the unknown capacitance (between the antenna electrode or the heating element and the counterelectrode). The reactive components may have mutually different reactance values.

Preferably, the combined seat heater and capacitive occupancy sensor or the capacitive sensor comprises an electronically controlled switching arrangement configured to individually activate and deactivate the reactive components. The switching arrangement may e.g. comprise electronically controlled switches (e.g. transistors) arranged each electrically in parallel to or in series with a respective reactive component.

The capacitive sensing network preferably includes a controller, such as e.g. a microcontroller, an application-specific integrated circuit (ASIC), a field-programmable gate array (FPGA), a digital signal processor (DSP) or the like, operatively connected with the electronically controlled switching arrangement to control said resonance frequency by activating or deactivating the electronically controlled switches or groups thereof.

The capacitive sensing network preferably comprises means to sustain the oscillating signal in or to drive the oscillating signal into the antenna electrode or the heating element as well as a high-impedance amplifier having an input node operatively connected to the antenna electrode or the heating element to probe the oscillating signal, and an output node to provide an output signal indicative of the oscillating signal. Preferably, the capacitive sensing network derives not only the capacitive load of the heating element but also the resistive part of the complex impedance between the heating element and ground.

Generally speaking, the output signal of the high-impedance amplifier allows measuring the voltage present on the antenna electrode or the heating element substantially without disturbing the measurement by its presence. The output voltage of the high-impedance amplifier permits to derive the complex impedance and thus the capacitance between the antenna electrode or heating element and ground. As the capacitance between the antenna electrode or heating element and ground depends on whether there is or not a conductive body (e.g. an occupant) in proximity of the antenna electrode or heating element, the occupancy state of an occupiable item (e.g. hospital bed, vehicle seat, office chair, etc.) containing the antenna electrode or the heating element can be derived from the output voltage of the high-impedance amplifier. As used herein, the term "impedance" designates the modulus (absolute value) of the complex impedance, which is itself defined as the ratio between (complex) voltage and (complex) current. When reference is made to the (complex) impedance to be measured or the capacitance to be measured, these terms designate the (complex) impedance or the capacitance between the heating element and the (typically grounded) counterelectrode (e.g. the vehicle frame). In the context of the present, the term "high-impedance amplifier" designates an amplifier, the complex impedance of which has a reactive part that is substantially higher (e.g. at least five times higher) than the reactive part of the complex impedance to be measured and a resistive part that is substantially higher (e.g. at least five times higher) than the resistive part of the complex impedance to be measured.

In the case of a combined seat heater and capacitive occupancy sensor, we will in the following assume that the heating current is direct current (DC) and that the oscillating signal sustained or driven into the heating element is an AC signal within a frequency region well above DC level. This is insofar a simplification that transient states (e.g. switching on/or off of the heating current), noise and parasitic currents are not taken into account. It should be noted that the heating current need not be direct current in the strictest sense: it may be variable, but on a long time-scale, so as not to interfere with the oscillating signal used for the capacitive measurement. For sake of simplicity, we will use "DC" to designate slowly varying or constant signals.

The means to sustain an oscillating signal in or to drive an oscillating signal into the antenna electrode or the heating element preferably comprises a negative resistance device (e.g. the "active" or power-supplying part of an oscillator circuit) to sustain the oscillating signal (at the resonance frequency) in the resonant network and to compensate for resistive losses and power extracted from the resonant network. The negative resistance device and the resonant network form together an oscillator, the resonance frequency of which depends on the inductance of the resonant network, and therefore, in particular, on the capacitance to be measured.

Preferably, the capacitive sensing network comprises a feedback branch from the output node of the high-impedance amplifier to the negative resistance device to regulate the amplitude of the oscillating signal to a reference amplitude.

The means to sustain an oscillating signal in or to drive an oscillating signal into the antenna electrode or the heating element may comprise an AC source operatively connected to the heating element to drive an alternative current into the resonant network and a frequency control unit for controlling the frequency of the alternative current. In this case, the oscillation of the resonant network is constrained to oscillation at the frequency determined by the frequency control unit. Preferably, the latter frequency is equal to or close to the resonance frequency of the resonant network (preferably within a narrow range around the resonance frequency). The complex impedance to be measured can then be obtained from the complex impedance of the resonant network, which is given by the ratio of the complex voltage probed by the high-impedance amplifier and the complex current driven into the resonant network by the AC source. The frequency control unit is preferably configured to vary the frequency of the alternative current within a frequency window. More preferably, the capacitive sensing network comprises a feedback branch from the output node of the high-impedance amplifier to the frequency control unit to regulate a phase difference of the output signal and the alternative current to a reference phase difference value. The reference phase difference value is preferably set to 0°, so that the feedback branch in fact regulates the frequency control unit to the resonance frequency of the resonant network.

Preferably, the extremities of the heating element are AC-coupled with one another, e.g. with a coupling capacitor. Such coupling capacitor is chosen to have an impedance that is substantially less than the impedance of the capacitance to be measured. The coupling capacitor thus represents a short for the AC component of the current but isolates the DC component thereof. A coupling capacitor between the extremities of the heating element ascertains that the capacitive occupancy sensor remains operational even if the heating element should break.

Preferably, the capacitive sensing network comprises a driven shield electrode. As used herein, the term driven shield electrode designates a further antenna electrode that is kept at substantially the same AC potential as the sensing antenna electrode or the heating element. As a consequence, the oscillating electric field substantially cancels between the driven shield electrode and the sensing antenna electrode or the heating element. It follows that a driven shield electrode substantially prevents the sensing antenna electrode or the heating element from capacitively coupling to objects, which, as seen from the sensing antenna electrode or the heating element, lie behind the driven shield electrode. One or more driven shield electrodes may thus be used to focus the sensitivity of the sensing antenna electrode or the heating element towards a region of interest, e.g. the part of space above a vehicle seat that is occupied by a normally seated occupant. To keep the driven shield electrode the same AC potential as the sensing antenna electrode or the heating element, an amplifier with high input impedance and gain substantially equal to 1, commonly known as a voltage follower or buffer amplifier, may be connected between the sensing antenna electrode or the heating element and the driven shield electrode to keep the driven shield electrode at the same AC potential as the sensing antenna electrode or the heating element.

A preferred aspect of the present invention concerns a vehicle seat equipped with a capacitive sensor or a combined seat heater and capacitive occupancy sensor.

Yet another aspect of the present invention concerns a capacitive sensing network configured to apply an oscillating signal to an antenna electrode forming a capacitance with a counterelectrode, the capacitance being responsive to an electric-field-influencing property of an object or person proximate to the antenna electrode, and to determine the capacitance based upon characteristics of the oscillating signal. The capacitive sensing network according to this aspect of the invention comprises an interface for connecting the capacitive sensing network to a seat heater including a heating element for dissipating heat when a heating current is caused to flow across the heating element, the interface being configured for operating the heating element as the antenna electrode. The interface comprises a common mode choke including a first winding for connecting a first node of the heating element to a first terminal of a power supply, a second winding for connecting a second node of the heating element to a second terminal of the power supply. The capacitive sensing network further includes a plurality of reactive components, arranged to form a resonant network with the first and/or the second winding of the common mode choke and the capacitance when the heating element is connected between the first and second windings, the plurality of reactive components being activatable and deactivatable in such a way as to modify a resonance frequency of the resonant network.

A capacitive sensing network according to this aspect of the invention may be used in combination with seat heaters known as such. This will be highly appreciated by the automotive industry, since it may be possible to use the same type of seat heater both in a configuration without capacitive occupancy sensing ability and in a configuration with capacitive occupancy sensing ability. In a vehicle seat without occupancy sensor, the seat heater may be directly plugged to the seat heater ECU including the power supply and the temperature controller, whereas in a vehicle seat with an occupancy sensor, the capacitive sensing network as described above may be connected between the seat heater ECU and the heating element as well as the temperature sensor.

BRIEF DESCRIPTION OF THE DRAWINGS

Further details and advantages of the present invention will be apparent from the following detailed description of limiting embodiments with reference to the attached drawings, wherein.

DESCRIPTION OF PREFERRED EMBODIMENTS

Figure 1:
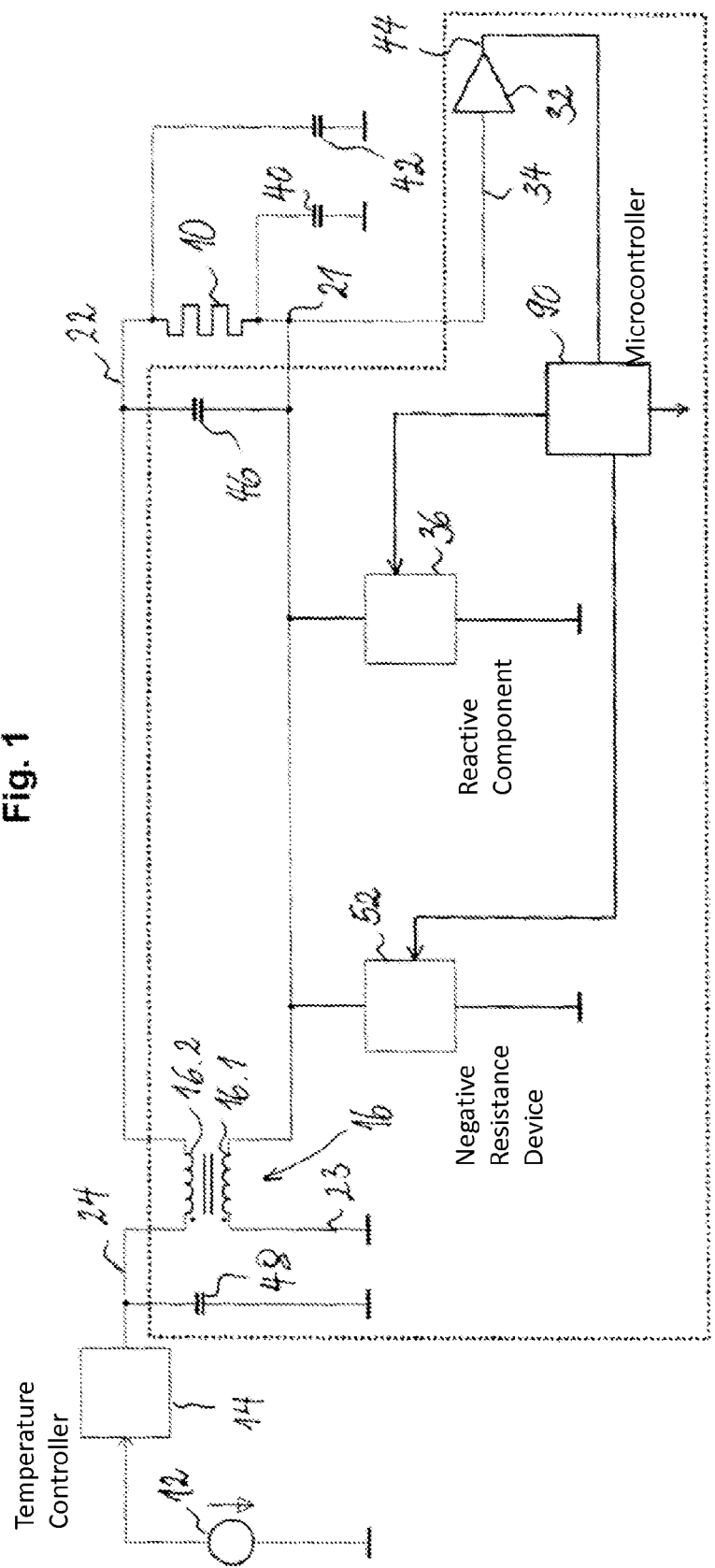
FIG. 1 is a schematic circuit diagram of a combined seat heater and capacitive occupancy sensor according to a preferred embodiment of the invention.

FIG. 1 shows a block schematic diagram of a combined seat heater and capacitive occupancy sensor according to an embodiment of the invention. The seat heater comprises a heating element 10, which is used by the capacitive occupancy sensor as an antenna electrode that capacitively couples to ground. The strength of the capacitive coupling between the heating element 10 and ground depends on whether an occupant is present in the zone between the heating element 10 and the grounded counter-electrode. In a loading-mode capacitive occupancy sensor for a vehicle seat, the grounded counter-electrode normally corresponds to the vehicle chassis.

Turning first to the seat heater, the heater network includes power source 12 supplying the required DC heating current to the heating element 10 to perform the heating function. The heater network comprises temperature controller 14, which turns the DC heating current on and off, depending on the actual and required temperature of the seat heater.

The heating element 10 is connected between a first 21 and a second 22 node. When a potential difference is applied by the power supply between the first and the second nodes 21, 22, the heating current flows across the heating element 10, which is thus caused to dissipate heat. The heating element 10 is operatively connected to the power source 12 with a common mode choke 16. A first 16.1 and a second 16.2 winding thereof connects the first 21 and the second 22 node to a third 23 and a fourth 24 node, respectively. In FIG. 1, the third node 23 corresponds to ground, whereas the fourth node 24 is operatively connected to the high potential terminal of the power source 12 via the temperature controller 14. The common mode choke 16 exhibits low impedance to DC but substantial impedance to AC at the operating frequency of the capacitive occupancy sensor.

The temperature controller 14 is operatively connected with a temperature sensor (not shown), which is arranged in vicinity of the heating element 10. The temperature controller 14 may comprise a user-actuatable master switch (not shown) allowing the user to activate or deactivate the seat heater as a whole and control electronics (including e.g. a thermostat) that regulate the temperature to ascertain comfortable seating. When the seat heater is operating, the temperature controller 14 opens and closes the heating circuit (pulse-width modulation of the heating current) in such a way as to achieve a preset target temperature. Preferably, the target temperature may be selected by the user using a temperature control interface (e.g. a knob, a slider, a wheel or the like). The master switch and the temperature control interface are preferably integrated in the same control element.

When the seat heater is supplied with DC heating current (i.e. when temperature controller 14 closes the heating circuit), current flows from power source 12 though the controller 14, the node 24 herein designated as fourth node, the second winding 16.2 of common mode choke 16, the node 22 herein designated as second node, the heating element 10, the node 21 herein designated as first node, the first winding 16.1 of common mode choke 16, the node 23 herein designated as the third node, which is tied to ground potential. The heating circuit is completed via the ground connection between the third node 23 and power source 12.

The capacitive sensing network (indicated in FIG. 1 by the dotted line) comprises a high-impedance amplifier 32, the input node 34 of which is connected to the heating element 10 at the first node 21, an active component (in this case the negative resistance device 52) operatively connected to the heating element 10 at the first node 21, a plurality of reactive components (generally indicated by reference number 36, detailed hereinafter) and a microcontroller 90 operatively connected to receive the output signal of the high-impedance amplifier and to control the negative resistance device as well as to activate or deactivate the reactive components 36.

Capacitors 40 and 42 symbolically represent the capacitive coupling of the heating element 10 to a grounded electrode (typically the vehicle frame). The capacitance (and hence the impedance) of these capacitors 40, 42 depends on whether the space between the heating element 10 and the grounded electrode is occupied by a conductive body (e.g. an occupant) or not. Capacitances 40 and 42 together represent the capacitance or impedance to be measured. It should be noted that the impedance to be measured behaves in practice like a distributed network comprising of resistive, capacitive and inductive parts. It is modelled for the purpose of this application by capacitors 40, 42, which are paralleled by a single resistance (not shown in the drawings). However, this simplified model is valid only for a single frequency, which means that the resistance and capacitance measured at a first frequency and the resistance and capacitance measured at a second frequency cannot be compared directly, i.e. without any compensation for the difference in frequency. Such compensation may, however, be omitted if measurement errors introduced by this effect are negligibly small. This is achieved by keeping the resonance frequency within a narrow frequency band (such that variation of the resonance frequency can be neglected).

Capacitances 40 and 42, as well as the reactive components 36 are electrically in parallel to the common mode choke 16 between the heating element 10 and ground. Accordingly, the common mode choke 16, the reactive components 36 and the capacitance to be measured form a parallel resonant network, the resonance frequency of which depends among others on the capacitance to be measured. The reactive components 36 may be individually switched active or inactive by the microcontroller 90 in such a way as to shift the resonance frequency into a desired frequency band.

Negative resistance device 52 is preferably the active, oscillation-sustaining part of an oscillator. It sustains an oscillating current in the resonant network by compensating for resistive losses, in such a way that the resonant network operates at its resonance frequency.

The high input impedance amplifier 32 probes the AC voltage on the first node 21 and outputs a corresponding output signal on output node 44, which is then processed further by the microcontroller 90 to derive the capacitance to be measured.

The complex impedance to be measured (and thus the capacitance to be measured) may be determined based on the frequency and the amplitude of the output signal, together with the known complex impedances of the common mode choke 16 and the reactive components 36.

The capacitive sensing network shown in FIG. 1 further comprises a coupling capacitor 46, which represents an AC shunt of the heating element 10. The impedance of capacitor 46 is chosen substantially smaller than the impedance of the total capacitance to be measured. In the absence of capacitor 46, an interruption (break) of the heating element 10 would result in a substantially smaller antenna electrode: this, in turn, would reduce the measurable capacitance. For instance, if heating element 10 shown in FIG. 1 broke in the middle, the measurement circuit would measure capacitance 40 (but not capacitance 42). Coupling capacitor 46 achieves an AC short between the first and second nodes 21, 22, i.e. the terminals of the heating element 10. If a (single) break occurs in heating element 10, then the capacitive sensing network remains substantially unaffected and still measures the total capacitance between the heating element 10 and ground due to the AC shunt provided by capacitor 46.

Coupling capacitor 48 provides an AC short between the third node 23 and the fourth node 24. Capacitor 48 avoids that any AC current is fed into the DC power source 12 and thereby possibly into the car power network.

Figure 2:
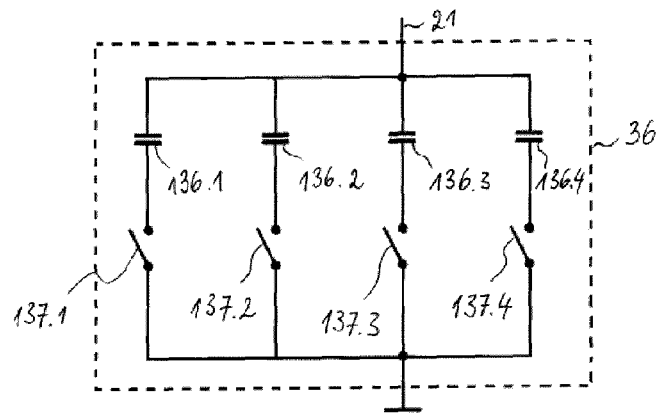
FIG. 2 is a schematic diagram of a first embodiment of the plurality of reactive components shown in FIG. 1.

FIG. 2 shows a first possible embodiment of the plurality of activatable or deactivatable reactive components 36. The plurality of activatable or deactivatable reactive components 36 comprises capacitors 136.1, 136.2, 136.3 and 136.4 arranged electrically in parallel. Each of the capacitors 136.1, 136.2, 136.3 and 136.4 is connected in series with an electronic switch 137.1, 137.2, 137.3 or 137.4, respectively. Electronic switches 137.1, 137.2, 137.3 and 137.4 are individually controllable by the microcontroller 90 (see FIG. 1) in order to activate or deactivate the corresponding capacitors 136.1, 136.2, 136.3 and 136.4. The capacitors 136.1, 136.2, 136.3 and 136.4 have known capacitances and are selectively connectable in parallel to the capacitance 40, 42 (see FIG. 1) to be measured. The switches 137.1, 137.2, 137.3 and 137.4 can for example be MOSFETs.

A problem which may arise when the inductance of a common mode choke is used as inductance of the parallel resonant LC tank together with the capacitance to be measured, is that the drift or temperature dependence or part tolerance of the inductance will lead to a measurement error of the unknown capacitance. The computation of the capacitance to be measured may be made independent on the complex impedance of the common mode choke 16 using the capacitors 136.1, 136.2, 136.3 or 136.4 or any combination thereof.

Each of the capacitors 136.1, 136.2, 136.3 and 136.4 has a known capacitance ($C_{136.1}$, $C_{136.2}$, $C_{136.3}$ and $C_{136.4}$, respectively). We will assume that the open-switch capacitances of switches 137.1, 137.2, 137.3 and 137.4 can be neglected compared to the capacitance of the associated capacitors 136.1, 136.2, 136.3 and 136.4.

To eliminate the potentially variable impedance, the following procedure may e.g. be executed under control of the microcontroller. A first measurement of the resonance frequency of the parallel resonant LC tank is made with a first combination of capacitors 136.1, 136.2, 136.3 and 136.4 activated (the corresponding switches 137.1, 137.2, 137.3 and 137.4 are closed). This frequency value is stored (here as fa). A second measurement of the resonance frequency is made with a second combination of the capacitors 136.1, 136.2, 136.3 and 136.4 activated (the corresponding switches 137.1, 137.2, 137.3 and 137.4 are closed), i.e. connected in parallel to the capacitance to be measured. The so-obtained frequency value is stored (here as fb). The first and second combinations of the capacitors 136.1, 136.2, 136.3 and 136.4 have to be chosen such that the resulting frequencies fa and fb are different. The relations between the resonance frequencies and the inductive and capacitive components of the circuit may be expressed through:

$$fa = \frac{1}{2\pi \cdot \sqrt{L \cdot (Cx + C_1)}}$$

$$fb = \frac{1}{2\pi \cdot \sqrt{L \cdot (Cx + C_2)}}$$

where L is the inductance of the common mode choke, Cx is the capacitance to be measured, $C_1$ is the total capacitance of the activated one(s) of capacitors 136.1, 136.2, 136.3 and 136.4 according to the first combination and $C_2$ is the total capacitance of the activated one(s) of capacitors 136.1, 136.2, 136.3 and 136.4 according to the second combination.

The two equations can be combined to yield Cx as a function of the measured frequencies fa and fb:

$$Cx = \frac{fa^2 C_1 - fb^2 C_2}{fb^2 - fa^2}$$

In the latter equation, the inductance L has been eliminated and thus does not influence the capacitance measurement.

Since the inductance L and the unknown capacitance Cx may not vary much between the measurements of the resonance frequencies fa and fb, these measurements have to be carried out sufficiently shortly one after the other.

At the resonance frequency, current and voltage of the parallel resonant network are in phase and the resistive part of the impedance to be measured thus corresponds to the ratio of the voltage to the current. The microcontroller may thus determine the resistive part of the impedance to be measured by measuring the voltage and the current across the resonant network.

Another advantage of the individually activatable capacitors 136.1, 136.2, 136.3 and 136.4 is that the microcontroller 90 can shift the resonance frequency to a predefined (narrow) target frequency band whether the seat is occupied or free. That predefined frequency band is preferably chosen such that it does not overlap with frequency bands occupied for transmission or reception by other devices in the vicinity of the combined seat heater and capacitive occupancy sensor or reserved frequency bands (e.g. AM radio frequency bands). By appropriately choosing the target frequency band wherein the combined seat heater and capacitive occupancy sensor may operate and selecting the reactive components in such a way that by activating or deactivating combinations thereof the resonance frequency of the resonant network may be shifted into the target frequency band for any unknown capacitance within a certain specified capacitance range, it will thus be possible to prevent or reduce electromagnetic interference with other electronic devices. This ascertains that other electronic devices may operate without being disturbed by the combined seat heater and capacitive occupancy sensor and that the combined seat heater and capacitive occupancy sensor may also operate without being disturbed by the other electronic devices. Automotive standards for example define levels of electromagnetic radiation, which must be tolerated by a measurement circuit without generating a measurement error. These levels depend on the frequency. Thanks to the present invention it is thus possible to avoid frequency bands wherein the tolerable radiation levels are large.

When the capacitive sensing network is powered up, the microcontroller 90 preferably controls the capacitive sensing network to perform one or more measurements of the unknown capacitance with a power level that is lower than during the normal measurements. This is because at start-up, the capacitance to be measured is completely unknown (it may be completely different from the capacitance at the previous shut-down of the system) and, hence, it is not known which will be the resulting resonance frequency. By keeping the amplitude of the LC tank at a lower level during start-up than during normal operation, it is avoided that the system generates significant interference outside its target frequency band. During this phase, the microcontroller 90 preferably dynamically adjusts the paralleled reactance 36 in such a way as to shift the resonance frequency into to the target frequency band. The microcontroller may achieve this using a feedback loop or by the calculating the amount by which the paralleled reactance must be increased or decreased and adjusting the paralleled reactance 36 in consequence.

The microcontroller 90 preferably maintains a safety margin between the current resonance frequency and the bounds of the target frequency band so as to be able to react in case the capacitance to be measured changes between the last and the next measurement. Thus, if the resonance frequency is too close to the upper or the lower bound of the target frequency band, the microcontroller 90 activates a different combination of the capacitors 136.1, 136.2, 136.3 and 136.4 such that the thus resulting resonance frequency is shifted towards the centre of the target frequency band. The repetition rate of the impedance measurements is selected depending on the safety margin of the target frequency band and the maximum expected rate of change of the capacitance to be measured. In particular, the repetition rate is chosen sufficiently high and the safety margin of the target frequency band sufficiently large to allow the microcontroller to deal with any impedance change that does not exceed a certain predefined rate of change. Preferably, the microcontroller is configured to reduce the power level of the LC tank in case the resonance frequency should accidentally leave the target frequency (e.g. due to an abrupt change of the capacitance to be measured). Once the paralleled reactance has been adjusted to the new situation and the resonance frequency has been shifted back to the target frequency band, the power level may again be raised.

It could happen that one or more of the reactive components break partly or completely, thereby changing their value, implying that the assumption of known value is not true anymore. This problem can be solved by adding in parallel to the capacitors 136.1, 136.2, 136.3 and 136.4 an additional set of capacitors having substantially the same capacitance values $C_{136.1}$, $C_{136.2}$, $C_{136.3}$ and $C_{136.4}$. In order to check the capacitance of e.g. capacitor 136.1, a measurement of the unknown capacitance may be performed a first time with capacitor 136.1 and a second time with the capacitor having the same nominal capacitance as capacitor 136.1. If these measurements yield different resonance frequencies, it can be deduced that the capacitor 136.1 or its duplicate is defective.

Numerical Example

FIG. 2

The target frequency band of the capacitive sensing network is assumed to range from 120 kHz to 150 kHz.

In this example, L (common mode choke inductance)=10 mH, $C_{136.1}$=10 pF, $C_{136.2}$=20 pF, $C_{136.3}$=40 pF, $C_{136.4}$=80 pF and switches 137.1, 137.2, 137.3 and 137.4 have negligible open-switch capacitances.

All the possible combinations of the paralleled capacitors 136.1, 136.2, 136.3 and 136.4 yield 16 different known capacitances, ranging from 0 pF (all switches 137.1, 137.2, 137.3 and 137.4 are open) to 150 pF (all switches 137.1, 137.2, 137.3 and 137.4 are closed). Assuming that 10 pF≤Cx≤100 pF, the total capacitance $C_{total}$, which is the sum of the unknown capacitance and the known capacitance, will range from 10 pF to 250 pF depending on the combination of activated capacitors 136.1, 136.2, 136.3 and 136.4. The resulting resonance frequencies will range from 100.66 kHz to 503.29 kHz.

In particular, the following resonance frequencies are obtainable if the unknown capacitance Cx amounts to 10 pF:

| Activated capacitances | $C_{known}$/pF | $C_{total}$/pF | $F_{res}$/kHz |
|---|---|---|---|
| none | 0 | 10 | 503.29 |
| $C_{136.1}$ | 10 | 20 | 355.88 |
| $C_{136.2}$ | 20 | 30 | 290.58 |
| $C_{136.1}$ and $C_{136.2}$ | 30 | 40 | 251.65 |
| $C_{136.3}$ | 40 | 50 | 225.08 |
| $C_{136.3}$ and $C_{136.1}$ | 50 | 60 | 205.47 |
| $C_{136.3}$ and $C_{136.2}$ | 60 | 70 | 190.23 |
| $C_{136.3}$ and $C_{136.1}$ and $C_{136.2}$ | 70 | 80 | 177.94 |
| $C_{136.4}$ | 80 | 90 | 167.76 |
| $C_{136.4}$ and $C_{136.1}$ | 90 | 100 | 159.15 |
| $C_{136.4}$ and $C_{136.2}$ | 100 | 110 | 151.75 |
| $C_{136.4}$ and $C_{136.1}$ and $C_{136.2}$ | 110 | 120 | 145.29 |
| $C_{136.4}$ and $C_{136.3}$ | 120 | 130 | 139.59 |
| $C_{136.4}$ and $C_{136.1}$ and $C_{136.3}$ | 130 | 140 | 134.51 |
| $C_{136.4}$ and $C_{136.2}$ and $C_{136.3}$ | 140 | 150 | 129.95 |
| $C_{136.1}$ to $C_{136.4}$ | 150 | 160 | 125.82 |

The usable (allowed) combinations of capacitors 136.1, 136.2, 136.3 and 136.4 and the corresponding frequencies in the target frequency band, with Cx=10 pF, are shown in bold.

If the unknown capacitance Cx amounts to 100 pF, the obtained resonance frequencies are:

| Activated capacitances | $C_{known}$/pF | $C_{total}$/pF | $F_{res}$/kHz |
|---|---|---|---|
| none | 0 | 100 | 159.15 |
| $C_{136.1}$ | 10 | 110 | 151.75 |
| $C_{136.2}$ | 20 | 120 | 145.29 |
| $C_{136.1}$ and $C_{136.2}$ | 30 | 130 | 139.59 |
| $C_{136.3}$ | 40 | 140 | 134.51 |
| $C_{136.3}$ and $C_{136.1}$ | 50 | 150 | 129.95 |
| $C_{136.3}$ and $C_{136.2}$ | 60 | 160 | 125.82 |
| $C_{136.3}$ and $C_{136.1}$ and $C_{136.2}$ | 70 | 170 | 122.07 |
| $C_{136.4}$ | 80 | 180 | 118.63 |
| $C_{136.4}$ and $C_{136.1}$ | 90 | 190 | 115.46 |
| $C_{136.4}$ and $C_{136.2}$ | 100 | 200 | 112.54 |
| $C_{136.4}$ and $C_{136.1}$ and $C_{136.2}$ | 110 | 210 | 109.83 |
| $C_{136.4}$ and $C_{136.3}$ | 120 | 220 | 107.3 |
| $C_{136.4}$ and $C_{136.1}$ and $C_{136.3}$ | 130 | 230 | 104.94 |
| $C_{136.4}$ and $C_{136.2}$ and $C_{136.3}$ | 140 | 240 | 102.73 |
| $C_{136.1}$ to $C_{136.4}$ | 150 | 250 | 100.66 |

The usable combinations of capacitors 136.1, 136.2, 136.3 and 136.4 and the corresponding frequencies in the target frequency band, with Cx=100 pF, are shown in bold.

If the inductance of the common mode choke is not precisely known (e.g. due to temperature variations, ageing, etc.), the unknown capacitance may be determined as described above, by using different pairs of combinations of capacitors 136.1, 136.2, 136.3 and 136.4 selected among the usable combinations. Designating by $Cx_i$ the capacitance value obtained by using a first combination (capacitance $C_{1,i}$, resonance frequency $fa_i$) and a second combination (capacitance $C_{2,i} \neq C_{1,i}$, resonance frequency $fb_i \neq fa_i$), one obtains:

$$Cx_i = \frac{fa_i^2 C_{1,i} - fb_i^2 C_{2,i}}{fb_i^2 - fa_i^2} \qquad (*)$$

With n usable combinations, there are $$\binom{n}{2} = n(n-1)$$

possible ways of calculating Cx using the above formula (*). Preferably, the microcontroller is configured to carry out a plurality of resonance frequency measurements using different allowed combinations of the capacitors 136.1, 136.2, 136.3 and 136.4, to calculate values $Cx_i$ (i=1 ... n(n-1)) of the unknown capacitance from a plurality of combination pairs and to compute the final value Cx of the unknown capacitance as the average or the median of the individual measurements $Cx_i$. The resistive part of the impedance is determined as the average or median of the calculated resistive parts for the different combination pairs. It should be noted that the averaging of the individual measurements of the capacitance and the individual measurements of the resistance is possible because the intervening resonance frequencies are all contained in a narrow frequency band (here: from 120 kHz to 150 kHz).

In case of interference with another electronic appliance in the neighbourhood of the capacitive sensing network, one or more of the calculated capacitance values $Cx_i$ may be invalid. If these invalid measurements were taken into account for the calculation of the average capacitance, this could give rise to a significant measurement error. Therefore, the capacitance values $Cx_i$ (i=1 ... n(n-1)) obtained with the different capacitor combinations are preferably analysed for outliers. Any method suitable for outlier detection in a population of measurement values can a priori be used in this context. For instance, one could calculate the difference $\Delta Cx_i$ between each value $Cx_i$ and the average or median value Cx ($\Delta Cx_i = Cx - Cx_i$) and discard those values $Cx_i$ that are more distant from the calculated average value Cx than a predetermined threshold value.

For example, taking the numerical values from the second table above, the measured resonance frequencies with $C_{known}$=30 pF, 40 pF, 50 pF, 60 pF and 70 pF are located within the target frequency band. The values $Cx_i$ are calculated using different combinations of the retained resonance frequencies. For this example, it is also assumed that an interference creates a measurement error of 1% of the measured resonance frequency measured with $C_{known}$=30 pF, that is, a resonance frequency of 140.99 kHz instead of the 139.59 kHz (as shown in the second table above) is measured.

The following table shows the calculated unknown capacitances $Cx_i$ (in pF) obtained by all the possible combinations of the measured resonance frequencies. The $C_{known}$-values in bold characters in the left column and the top row indicate the known capacitances in pF that have been used to calculate the unknown capacitances $Cx_i$.

| C known | 30 | 40 | 50 | 60 |
|---------|------|-------|-------|-------|
| 40 | 71.5 | | | |
| 50 | 83.0 | 100.0 | | |
| 60 | 87.4 | 100.0 | 100.0 | |
| 70 | 89.8 | 100.0 | 100.0 | 100.0 |

The median value of all the calculated values in this example is 100 pF. A threshold is defined which determines which unknown capacitances are considered to be valid. For this example, the threshold is defined to be 10%, that is, all the values that are lower than 90% of the median value and all the values that are above 110% of the median value are discarded. From the table above, all the unknown capacitances $Cx_i$ measured with an applied known capacitance of 30 pF are therefore discarded.

As an alternative to the detection of outliers among the values $Cx_i$ (i=1 . . . n(n-1)), the microcontroller may proceed as follows. For each of the allowed combinations of capacitors 136.1, 136.2, 136.3 and 136.4, several measurements of the resonance frequency and of the parallel resistance are carried out. The standard deviation of each measured resonance frequency and of the equivalent parallel resistance is calculated. If the standard deviation of the frequency and/or the parallel resistance exceeds a predetermined threshold, the corresponding measured capacitance and resistance of that resonance frequency are discarded.

The capacitors of known value can also be replaced individually or altogether with inductances, or any complex impedances, i.e. combinations of a reactive and a resistive part.

Figure 3:
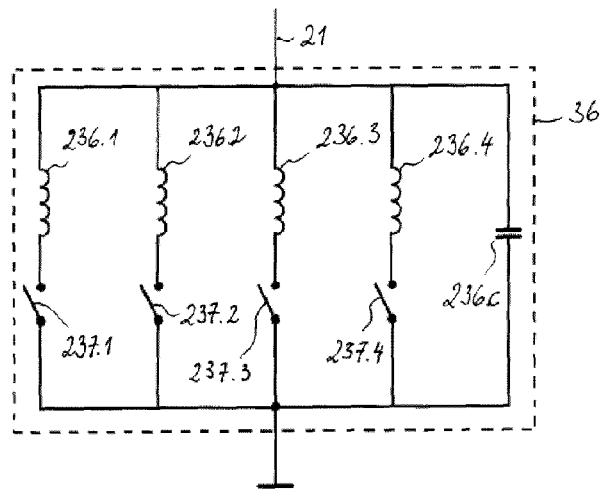
FIG. 3 is a schematic diagram of a second embodiment of the plurality of reactive components shown in FIG. 1.

FIG. 3 shows a second possible embodiment of the plurality of activatable or deactivatable reactive components 36 (see also FIG. 1). According to this embodiment, the plurality of activatable or deactivatable reactive components 36 comprises a capacitor 236c, arranged in parallel with inductors 236.1, 236.2, 236.3 and 236.4. Each of the inductors 236.1, 236.2, 236.3 and 236.4 is connected in series with an electronic switch 237.1, 237.2, 237.3 or 237.4, respectively. Electronic switches 237.1, 237.2, 237.3 and 237.4 are individually controllable by the microcontroller 90 (see FIG. 1) in order to activate or deactivate the corresponding inductors 236.1, 236.2, 236.3 and 236.4. The inductors 236.1, 236.2, 236.3 and 236.4 have known inductance each and are selectively connectable in parallel to the capacitor 236c and the capacitance 40, 42 (see FIG. 1) to be measured. The switches 237.1, 237.2, 237.3 and 237.4 can for example be MOSFETs. The parallel capacitor 236c has a known capacitance and is provided to keep the resonance frequency of the resonant network in an acceptable range while using practical inductance values for the known inductors 236.1, 236.2, 236.3 and 236.4.

To eliminate the potentially variable impedance of the common mode choke, the following procedure may e.g. be executed under control of the microcontroller 90 (see FIG. 1). A first measurement of the resonance frequency of the parallel resonant LC tank is made with a first combination of inductors 236.1, 236.2, 236.3 and 236.4 activated (the corresponding switches 237.1, 237.2, 237.3 and 237.4 are closed). This frequency value is stored (here as fa). A second measurement of the resonance frequency is made with a second combination of the capacitors 236.1, 236.2, 236.3 and 236.4 activated (the corresponding switches 237.1, 237.2, 237.3 and 237.4 are closed), i.e. connected in parallel to the capacitance to be measured. The so-obtained frequency value is stored (here as fb). The first and second combinations of the inductors 236.1, 236.2, 236.3 and 236.4 have to be chosen such that the resulting frequencies fa and fb are different. The relations between the resonance frequencies and the inductive and capacitive components of the circuit may be expressed through:

$$fa = \frac{1}{2\pi \cdot \sqrt{\frac{L \cdot L_1}{L_1 + L} \cdot (Cx + C_{236c})}}$$

$$fb = \frac{1}{2\pi \cdot \sqrt{\frac{L \cdot L_2}{L_2 + L} \cdot (Cx + C_{236c})}}$$

where L is the inductance of the common mode choke, Cx is the capacitance to be measured, $L_1$ is the total inductance of the activated one(s) of inductors 236.1, 236.2, 236.3 and 236.4 according to the first combination, $L_2$ is the total capacitance of the activated one(s) of capacitors 236.1, 236.2, 236.3 and 236.4 according to the second combination and $C_{236c}$ is the capacitance of capacitor 236c. These equations can be combined to yield Cx as a function of the measured frequencies fa and fb:

$$Cx = \frac{L_1 - L_2}{(2\pi)^2 \cdot L_1 \cdot L_2 \cdot (fa^2 - fb^2)} - C_{236c}.$$

In the latter equation, the inductance L has been eliminated and thus does not influence the capacitance measurement.

Since the inductance L and the unknown capacitance Cx may not vary much between the measurements of the resonance frequencies fa and fb, these measurements have to be carried out sufficiently shortly one after the other.

At the resonance frequency, current and voltage of the parallel resonant network are in phase and the resistive part of the impedance to be measured thus corresponds to the ratio of the voltage to the current. The microcontroller 90 (FIG. 1) may thus determine the resistive part of the impedance to be measured by measuring the voltage and the current across the resonant network.

As for the embodiment of FIG. 2, the microcontroller 90 may shift the resonance frequency of the capacitive sensing network by activating or deactivating the reactive components, i.e. in this case the inductors 236.1, 236.2, 236.3 and 236.4. The microcontroller may in particular be configured to run a similar start-up procedure and take similar measures to ascertain low or no electromagnetic interference with other appliances as described with respect to the embodiment of FIG. 1.

Numerical Example

FIG. 3

In this example, capacitor 236c is assumed to have a capacitance of 300 pF, L (common mode choke inductance) =10 mH, and the inductances $L_{236.1}$, $L_{236.2}$, $L_{236.3}$ and $L_{236.4}$ of the inductors 236.1, 236.2, 236.3 and 236.4 are 20 mH, 10 mH, 5 mH and 2.5 mH, respectively. It will be assumed that the open-switch capacitances of switches 237.1, 237.2, 237.3 and 237.4 can be neglected.

The target frequency band of the capacitive sensing network is assumed to range from 120 kHz to 150 kHz.

By activating or deactivating different groups of the inductors 236.1, 236.2, 236.3 and 236.4, the following resonance frequencies (Fres) may be obtained for an unknown capacitance of 0 pF:

| Activated inductances | $L_{known}$/mH | $L_{total}$/mH | $F_{res}$/kHz |
|---|---|---|---|
| none | / | 10 | 91.89 |
| $L_{236.1}$ | 20 | 6.67 | 112.54 |
| $L_{236.2}$ | 10 | 5 | 129.95 |
| $L_{236.1}$ and $L_{236.2}$ | 6.67 | 4 | 145.29 |
| $L_{236.3}$ | 5 | 3.33 | 159.15 |
| $L_{236.3}$ and $L_{236.1}$ | 4 | 2.86 | 171.91 |
| $L_{236.3}$ and $L_{236.2}$ | 3.33 | 2.5 | 183.78 |
| $L_{236.3}$ and $L_{236.1}$ and $L_{236.2}$ | 2.86 | 2.22 | 194.92 |
| $L_{236.4}$ | 2.5 | 2 | 205.47 |
| $L_{236.4}$ and $L_{236.1}$ | 2.22 | 1.82 | 215.5 |
| $L_{236.4}$ and $L_{236.2}$ | 2 | 1.67 | 225.08 |
| $L_{236.4}$ and $L_{236.1}$ and $L_{236.2}$ | 1.82 | 1.54 | 234.27 |
| $L_{236.4}$ and $L_{236.3}$ | 1.67 | 1.43 | 243.11 |
| $L_{236.4}$ and $L_{236.1}$ and $L_{236.3}$ | 1.54 | 1.33 | 251.65 |
| $L_{236.4}$ and $L_{236.2}$ and $L_{236.3}$ | 1.43 | 1.25 | 259.9 |
| $L_{236.1}$ to $L_{236.4}$ | 1.33 | 1.18 | 267.9 |

Resonance frequencies that lie inside the target frequency band are again in bold characters.

The following table shows the same results with an unknown capacitance of 100 pF:

| Activated inductances | $L_{known}$/mH | $L_{total}$/mH | $F_{res}$/kHz |
|---|---|---|---|
| none | / | 10 | 79.58 |
| $L_{236.1}$ | 20 | 6.67 | 97.46 |
| $L_{236.2}$ | 10 | 5 | 112.54 |
| $L_{236.1}$ and $L_{236.2}$ | 6.67 | 4 | 125.82 |
| $L_{236.3}$ | 5 | 3.33 | 137.83 |
| $L_{236.3}$ and $L_{236.1}$ | 4 | 2.86 | 148.88 |
| $L_{236.3}$ and $L_{236.2}$ | 3.33 | 2.5 | 159.15 |
| $L_{236.3}$ and $L_{236.1}$ and $L_{236.2}$ | 2.86 | 2.22 | 168.81 |
| $L_{236.4}$ | 2.5 | 2 | 177.94 |
| $L_{236.4}$ and $L_{236.1}$ | 2.22 | 1.82 | 186.63 |
| $L_{236.4}$ and $L_{236.2}$ | 2 | 1.67 | 194.92 |
| $L_{236.4}$ and $L_{236.1}$ and $L_{236.2}$ | 1.82 | 1.54 | 202.88 |
| $L_{236.4}$ and $L_{236.3}$ | 1.67 | 1.43 | 210.54 |
| $L_{236.4}$ and $L_{236.1}$ and $L_{236.3}$ | 1.54 | 1.33 | 217.93 |
| $L_{236.4}$ and $L_{236.2}$ and $L_{236.3}$ | 1.43 | 1.25 | 225.08 |
| $L_{236.1}$ to $L_{236.4}$ | 1.33 | 1.18 | 232.01 |

The usable combinations of inductors 236.1, 236.2, 236.3 and 236.4 and the corresponding frequencies in the target frequency band, with Cx=100 pF, are shown in bold.

The microcontroller 90 (FIG. 1) may thus control the switches 237.1, 237.2, 237.3 and 237.4 in such a way as to keep the resonance frequency within the target frequency band when the capacitance to be measured varies.

As for the previous example, the microcontroller may advantageously be configured such that it uses different pairs of combinations of inductors 236.1, 236.2, 236.3 and 236.4 selected among the usable combinations in order to measure a plurality of capacitance values $Cx_i$. The microcontroller may then compute the final value Cx of the unknown capacitance as the average or the median of the individual measurements $Cx_i$. The resistive part of the impedance is determined as the average or median of the calculated resistive parts for the different combination pairs.

Figure 4:
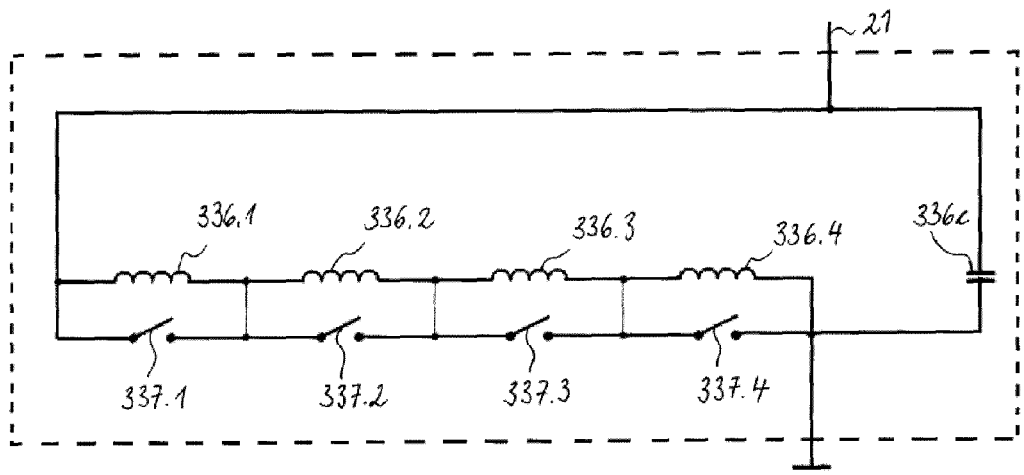
FIG. 4 is a schematic diagram of a third embodiment of the plurality of reactive components shown in FIG. 1.

FIG. 4 shows a third possible embodiment of the plurality of activatable or deactivatable reactive components 36 (see FIG. 1). According to this embodiment, the plurality of activatable or deactivatable reactive components 36 comprises a capacitor 336c, arranged in parallel with a series of inductors 336.1, 336.2, 336.3 and 336.4. The microcontroller 90 control the overall impedance of the network of inductors 336.1, 336.2, 336.3 and 336.4 by activating different groups of the inductors 336.1, 336.2, 336.3 and 336.4 at a time. Each of the inductors 336.1, 336.2, 336.3 and 336.4 is connected parallel to an electronic switch 337.1, 337.2, 337.3 or 337.4, respectively. Electronic switches 337.1, 337.2, 337.3 and 337.4 are individually controllable by the microcontroller 90 (see FIG. 1) in order to activate or deactivate the corresponding inductors 336.1, 336.2, 336.3 and 336.4. The inductors 336.1, 336.2, 336.3 and 336.4 have known inductance each may and be selectively deactivated by closing the corresponding switch 337.1, 337.2, 337.3 or 337.4, respectively. The switches 337.1, 337.2, 337.3 and 337.4 can for example be MOSFETs. The parallel capacitor 336c has a known capacitance and is provided to keep the resonance frequency of the resonant network in an acceptable range while using practical inductance values for the known inductors 336.1, 336.2, 336.3 and 336.4.

Numerical Example

FIG. 4

In this example, capacitor 336c is assumed to have a capacitance of 300 pF, L (common mode choke inductance)= 10 mH, and the inductances $L_{336.1}$, $L_{336.2}$, $L_{336.3}$ and $L_{336.4}$ of the inductors 336.1, 336.2, 336.3 and 336.4 are 1.25 mH, 2.5 mH, 5 mH and 10 mH, respectively. It will be assumed that the open-switch capacitances of switches 337.1, 337.2, 337.3 and 237.4 can be neglected.

The target frequency band of the capacitive sensing network is assumed to range from 120 kHz to 150 kHz.

By activating or deactivating different groups of the inductors 336.1, 336.2, 336.3 and 336.4, the following resonance frequencies (Fres) may be obtained for an unknown capacitance of 0 pF:

| Activated inductances | $L_{known}$/mH | $L_{total}$/mH | $F_{res}$/kHz |
|---|---|---|---|
| $L_{336.1}$ | 1.25 | 1.11 | 275.66 |
| $L_{336.2}$ | 2.5 | 2 | 205.47 |
| $L_{336.1}$ and $L_{336.2}$ | 3.75 | 2.73 | 175.95 |
| $L_{336.3}$ | 5 | 3.33 | 159.15 |
| $L_{336.3}$ and $L_{336.1}$ | 6.25 | 3.85 | 148.17 |
| $L_{336.3}$ and $L_{336.2}$ | 7.5 | 4.29 | 140.36 |
| $L_{336.3}$ and $L_{336.1}$ and $L_{336.2}$ | 8.75 | 4.67 | 134.51 |
| $L_{336.4}$ | 10 | 5 | 129.95 |
| $L_{336.4}$ and $L_{336.1}$ | 11.25 | 5.29 | 126.29 |
| $L_{336.4}$ and $L_{336.2}$ | 12.5 | 5.56 | 123.28 |
| $L_{336.4}$ and $L_{336.1}$ and $L_{336.2}$ | 13.75 | 5.79 | 120.76 |
| $L_{336.4}$ and $L_{336.3}$ | 15 | 6 | 118.63 |
| $L_{336.4}$ and $L_{336.1}$ and $L_{336.3}$ | 16.25 | 6.19 | 116.79 |
| $L_{336.4}$ and $L_{336.2}$ and $L_{336.3}$ | 17.5 | 6.36 | 115.19 |
| $L_{336.1}$ to $L_{336.4}$ | 18.75 | 6.52 | 113.78 |

Resonance frequencies that lie inside the target frequency band are in bold characters.

The following table shows the same results with an unknown capacitance of 100 pF:

| Activated inductances | $L_{known}$/mH | $L_{total}$/mH | $F_{res}$/kHz |
|---|---|---|---|
| $L_{336.1}$ | 1.25 | 1.11 | 238.73 |
| $L_{336.2}$ | 2.5 | 2 | 177.94 |
| $L_{336.1}$ and $L_{336.2}$ | 3.75 | 2.73 | 152.38 |
| $L_{336.3}$ | 5 | 3.33 | 137.83 |
| $L_{336.3}$ and $L_{336.1}$ | 6.25 | 3.85 | 128.31 |
| $L_{336.3}$ and $L_{336.2}$ | 7.5 | 4.29 | 121.56 |

-continued

| Activated inductances | $L_{known}$/mH | $L_{total}$/mH | $F_{res}$/kHz |
|---|---|---|---|
| $L_{336.3}$ and $L_{336.1}$ and $L_{336.2}$ | 8.75 | 4.67 | 116.49 |
| $L_{336.4}$ | 10 | 5 | 112.54 |
| $L_{336.4}$ and $L_{336.1}$ | 11.25 | 5.29 | 109.37 |
| $L_{336.4}$ and $L_{336.2}$ | 12.5 | 5.56 | 106.76 |
| $L_{336.4}$ and $L_{336.1}$ and $L_{336.2}$ | 13.75 | 5.79 | 104.59 |
| $L_{336.4}$ and $L_{336.3}$ | 15 | 6 | 102.73 |
| $L_{336.4}$ and $L_{336.1}$ and $L_{336.3}$ | 16.25 | 6.19 | 101.14 |
| $L_{336.4}$ and $L_{336.2}$ and $L_{336.3}$ | 17.5 | 6.36 | 99.76 |
| $L_{336.1}$ to $L_{336.4}$ | 18.75 | 6.52 | 98.54 |

The usable combinations of inductors 336.1, 336.2, 336.3 and 336.4 and the corresponding frequencies in the target frequency band, with Cx=100 pF, are shown in bold.

As another option, instead of using only either switchable capacitors or inductors as in the examples of FIGS. 2-4, switchable paralleled inductors and capacitors can be used as reactive components.

Figure 5:
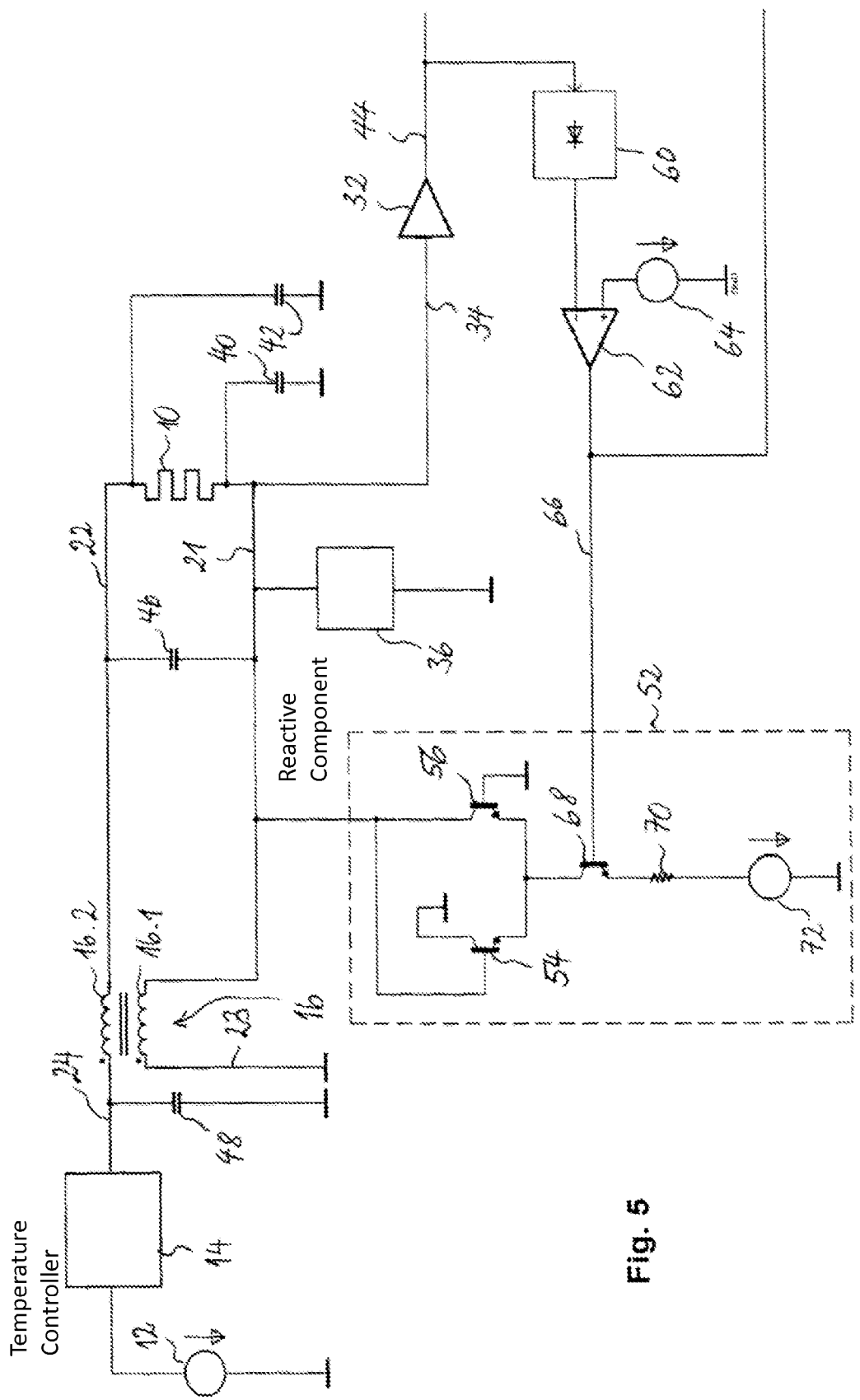
FIG. 5 is a schematic circuit diagram of a preferred implementation of the combined seat heater and capacitive occupancy sensor of FIG. 1.

FIG. 5 shows a practical implementation of the circuit in FIG. 1. In particular, FIG. 5 illustrates a possible way to implement the negative resistance device 52 of FIG. 1. FIG. 5 thus uses the same reference numbers as FIG. 1 where appropriate. Elements that have already been discussed with reference to FIG. 1 will not be discussed again for sake of conciseness. The microcontroller 90 is not shown in FIG. 5.

The negative resistance device 52 is the active, oscillation-sustaining part of an oscillator. It is the active part of an emitter-coupled LC oscillator and is comprised of transistors 54 and 56 and a current sink (transistor 68, resistor 70 and bias voltage source 72). The same circuit is implemented as oscillator core in the Motorola MC1648 'Voltage controlled oscillator' integrated circuit. Transistor 54 samples the voltage across the parallel resonant network, and steers the current through transistor 56 via the common emitter connection. Current through transistor 56 is itself fed back via its collector into the parallel resonant network, thereby sustaining the oscillation of the oscillator. The current sink supplies the operating current to the circuit. A distinction is sometimes made between a current source and current sink. The former term then designates a device having a positive current flowing out of it, whereas "current sink" designates a device having a positive current flowing into it (or, likewise, a negative current flowing out of it). It the context of the present, taking into account that current is generally considered an algebraic quantity that can be positive and negative, the term "current sink" may also be a "current source".

The high-impedance amplifier probes the AC voltage on the first node 21 and outputs a corresponding output signal on its output node 44. If the supply current generated by the current sink is set to an appropriate value, the amplitude of the AC voltage on node 21 depends essentially only on the resistive component of the resonant network. The capacitance to be measured may then be calculated based on the frequency of the output signal of high-impedance amplifier 32 as described hereinbefore. In addition, the resistive part of the complex impedance to be measured can be determined by measuring the amplitude of the output signal on node 44 and/or the DC power drawn by the current sink from its power supply. The resonance frequency of the resonant network may be adjusted as described hereinabove.

The embodiment shown in FIG. 5 implements an 'automatic levelling loop' (e.g. as implemented in the Motorola MC1648 'Voltage controlled oscillator' integrated circuit mentioned above). Rectifier 60 converts the peak amplitude of the output signal of high-impedance amplifier, which is proportional to the amplitude of the AC voltage at node 21 into a proportional DC voltage. An error amplifier 62 compares this DC voltage with a reference value defined by voltage source 64, and outputs a control voltage on its output node 66. That control voltage controls the current sink comprised of transistor 68, resistor 70 and bias voltage source 72 in such a way that the resonant network amplitude (the amplitude of the AC voltage on node 21) remains substantially constant. The magnitude of the current through the current sink around transistor 68 is then inversely responsive to the parallel resistive component of the resonant network. Since the control voltage of node 66 is substantially proportional to the current through the current sink, the control voltage of node 66 can be used to calculate the resistive value of the impedance to be determined.

Figure 6:
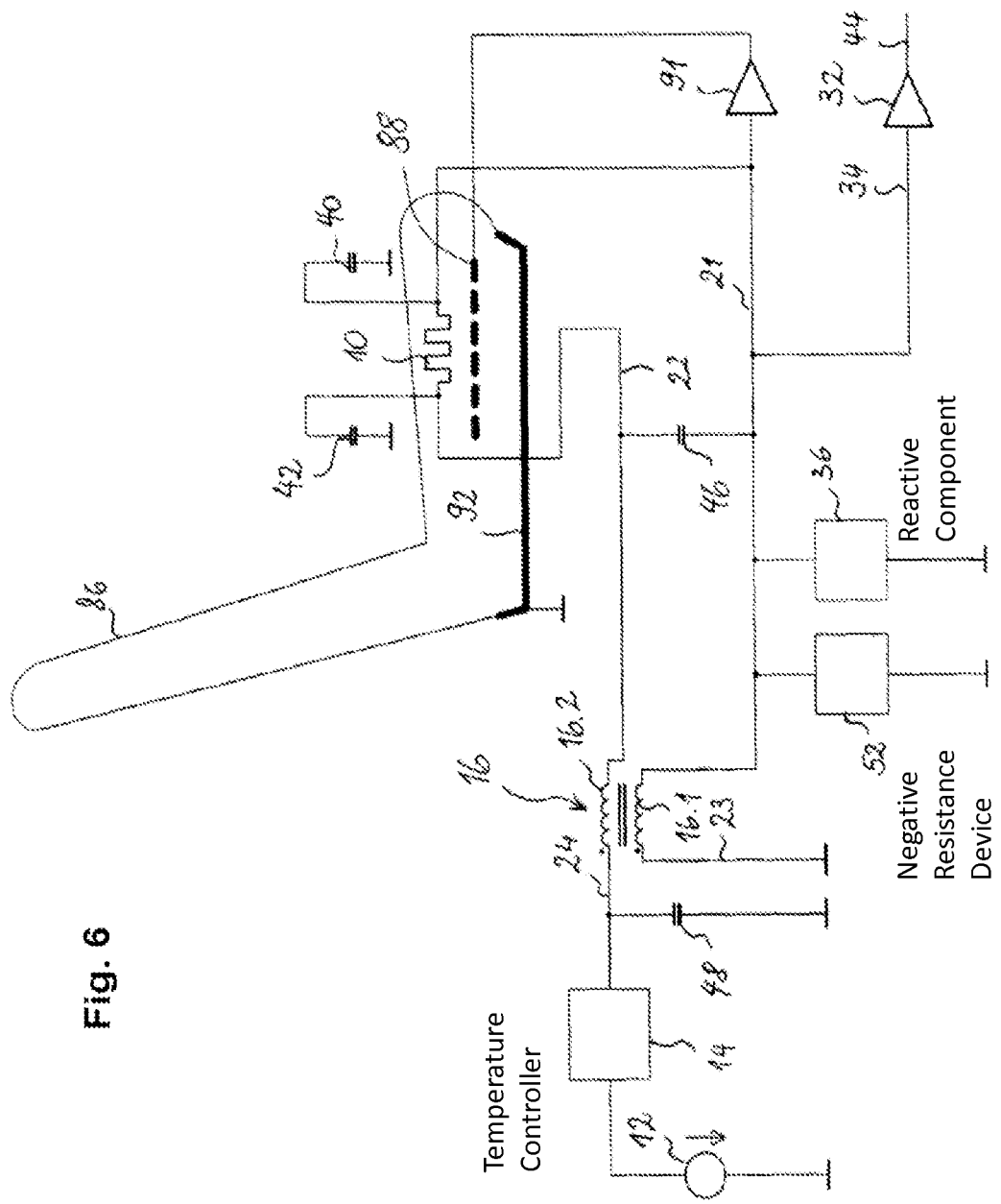
FIG. 6 is a schematic illustration of a vehicle seat equipped with a combined seat heater and capacitive occupancy sensor substantially as in FIG. 1.

FIG. 6 schematically shows a vehicle seat 86 equipped with a combined seat heater and capacitive occupancy sensor, which essentially corresponds to the one shown in FIG. 1, except for the driven shield electrode (or guard electrode) 88 connected to the first node 21 via a voltage follower 91. The combined seat heater and capacitive occupancy sensor of FIG. 6 comprises a plurality of activatable or deactivatable reactive components 36 (also referred to as paralleled reactance) that may e.g. be implemented as shown in FIGS. 2-4 and described hereinabove.

Heating element 10 is arranged in seat 86, more specifically underneath the seating surface. In addition to the capacitance or impedance to be measured (illustrated again by capacitors 40 and 42), there is an additional capacitance between the heating element 10 and the seat frame 92. The additional capacitance is in parallel to the capacitance to be measured and may introduce considerable measurement errors, because it is not well known and may vary during the lifetime of the application. In order to suppress the influence of the additional capacitance, a guard electrode 88 is arranged between the seat heater 10 and the seat frame 92. The guard electrode 88 may e.g. be a conductive foil or textile, which covers at least the area spanned by the heating element 10. Preferably the guard electrode 88 is larger than the area spanned by the heating element 10 for better shielding. As indicated above, the guard electrode 88 is electrically connected to via voltage follower 91. Voltage follower 91 has high input impedance in order not to disturb the measurement. The voltage follower 91 keeps the voltage on the guard electrode 88 substantially equal to the voltage on the heating element 10. Therefore, when the capacitive measurement is carried out, there is no or only a very small AC voltage difference between the heating element 10 and the guard electrode 88. As a result, substantially no AC current flows between the heating element 10 and the guard electrode 88. The guard electrode 88 being arranged between the heating element 10 and the seat frame 92, substantially no AC current flows between the heating element 10 and the seat frame 92.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:
1. A capacitive sensor, comprising
an antenna electrode for capacitively coupling to a counterelectrode to form a capacitance, said capacitance being responsive to an electric-field-influencing property of an object or person proximate to said antenna electrode;
a capacitive sensing network connected to said antenna electrode to apply an oscillating signal thereto and to determine said capacitance based upon characteristics of said oscillating signal;
wherein said capacitive sensing network includes at least one inductor and a plurality of reactive components arranged to form a resonant network with said capacitance, said plurality of reactive components being activatable or deactivatable by a controller in such a way as to modify a resonance frequency of said resonant network.

2. The capacitive sensor as claimed in claim 1, wherein said reactive components comprise capacitors.

3. The capacitive sensor as claimed in claim 1, wherein said reactive components comprise further inductors.

4. The capacitive sensor as claimed in claim 1, comprising an electronically controlled switching arrangement configured to individually activate and deactivate said reactive components.

5. The capacitive sensor as claimed in claim 4, wherein said capacitive sensing network includes a controller operatively connected with said electronically controlled switching arrangement to control said resonance frequency.

6. The capacitive sensor as claimed in claim 1, wherein said capacitive sensing network comprises
means to sustain said oscillating signal in or to drive said oscillating signal into said antenna electrode or said heating element;
as well as a high-impedance amplifier having an input node operatively connected to said antenna electrode or said heating element to probe said oscillating signal, and an output node to provide an output signal indicative of said oscillating signal.

7. The capacitive sensor as claimed in claim 6, wherein said means to sustain said oscillating signal in or to drive said oscillating signal into said antenna electrode or said heating element comprises a negative resistance device to sustain said oscillating signal in said resonant network and to compensate for resistive losses and power extracted from said resonant network.

8. The capacitive sensor as claimed in claim 7, wherein said capacitive sensing network comprises a feedback branch from the output node of said high-impedance amplifier to said negative resistance device to regulate an amplitude of said oscillating signal to a reference amplitude.

9. The capacitive sensor as claimed in claim 6, wherein said means to sustain said oscillating signal in or to drive said oscillating signal into said antenna electrode or said heating element comprises an AC source operatively connected to said antenna electrode or said heating element to drive as said oscillating signal an alternative current into said resonant network and a frequency control unit for controlling the frequency of said alternative current.

10. The capacitive sensor as claimed in claim 1, wherein said capacitive sensing network comprises a driven shield electrode.

11. The capacitive sensor as claimed in claim 10, comprising a voltage follower connected between said antenna electrode or said heating element and said driven shield electrode to keep said driven shield electrode at the same AC potential as said antenna electrode or said heating element.

12. A vehicle seat, comprising a capacitive sensor as claimed in claim 1.

13. A combined seat heater and capacitive occupancy sensor, comprising:
a heater network including a heating element connected between a first node and a second node to dissipate heat when a heating current is caused to flow between said first and second nodes, across said heating element,
a capacitive sensing network connected to said heating element to use said heating element as an antenna electrode, said heating element being arranged for forming a capacitance with a counterelectrode, said capacitance being responsive to an electric-field-influencing property of an object or person proximate to said heating element, said capacitive sensing network being configured to apply an oscillating signal to said heating element and to determine said capacitance based upon characteristics of said oscillating signal;
wherein said heater network comprises a common mode choke with at least two windings, said heating element being connected in series between a first and a second winding of said at least two windings so as to be operatively connectable to a power source via said common mode choke;
and wherein said capacitive sensing network includes a plurality of reactive components, arranged to form a resonant network with at least one of said first and/or second winding and with said capacitance, said plurality of reactive components being activatable or deactivatable by a controller in such a way as to modify a resonance frequency of said resonant network.

14. The combined seat heater and capacitive occupancy sensor as claimed in claim 13, wherein said reactive components comprise at least one of capacitors and inductors.

15. The combined seat heater and capacitive occupancy sensor as claimed in claim 13, comprising an electronically controlled switching arrangement configured to individually activate and deactivate said reactive components.

16. The combined seat heater and capacitive occupancy sensor as claimed in claim 15, wherein said capacitive sensing network includes a controller operatively connected with said electronically controlled switching arrangement to control said resonance frequency.

17. The combined seat heater and capacitive occupancy sensor as claimed in claim 13, wherein said capacitive sensing network comprises
means to sustain said oscillating signal in or to drive said oscillating signal into said antenna electrode or said heating element;
as well as a high-impedance amplifier having an input node operatively connected to said antenna electrode or said heating element to probe said oscillating signal, and an output node to provide an output signal indicative of said oscillating signal.

18. The combined seat heater and capacitive occupancy sensor as claimed in claim 17, wherein said means to sustain said oscillating signal in or to drive said oscillating signal into said antenna electrode or said heating element comprises a negative resistance device to sustain said oscillating signal in said resonant network and to compensate for resistive losses and power extracted from said resonant network.

19. The combined seat heater and capacitive occupancy sensor as claimed in claim 18, wherein said capacitive sensing network comprises a feedback branch from the output node of said high-impedance amplifier to said negative resistance device to regulate an amplitude of said oscillating signal to a reference amplitude.

20. The combined seat heater and capacitive occupancy sensor as claimed in claim 17, wherein said means to sustain said oscillating signal in or to drive said oscillating signal into said antenna electrode or said heating element comprises an AC source operatively connected to said antenna electrode or said heating element to drive as said oscillating signal an alternative current into said resonant network and a frequency control unit for controlling the frequency of said alternative current.

21. The combined seat heater and capacitive occupancy sensor as claimed in claim 13, wherein said capacitive sensing network comprises a driven shield electrode.

22. The combined seat heater and capacitive occupancy sensor as claimed in claim 21, comprising a voltage follower connected between said antenna electrode or said heating element and said driven shield electrode to keep said driven shield electrode at the same AC potential as said antenna electrode or said heating element.

23. A vehicle seat, comprising a combined seat heater and capacitive occupancy sensor as claimed in claim 13.

24. A capacitive sensing network configured to apply an oscillating signal to an antenna electrode forming a capacitance with a counterelectrode, said capacitance being responsive to an electric-field-influencing property of an object or person proximate to said antenna electrode, and to determine said capacitance based upon characteristics of said oscillating signal;

said capacitive sensing network comprising an interface for connecting said capacitive sensing network to a seat heater including a heating element for dissipating heat when a heating current is caused to flow across said heating element, said interface being configured for operating said heating element as said antenna electrode, wherein said interface comprises a common mode choke including a first winding for connecting a first node of said heating element to a first terminal of a power supply, a second winding for connecting a second node of said heating element to a second terminal of said power supply, and wherein said capacitive sensing network includes a plurality of reactive components, arranged to form a resonant network with said first and second windings and said capacitance when said heating element is connected between said first and second windings, said plurality of reactive components being activatable or deactivatable by a controller in such a way as to modify a resonance frequency of said resonant network.

* * * * *